(12) United States Patent
Mongia et al.

(10) Patent No.: US 7,243,497 B2
(45) Date of Patent: Jul. 17, 2007

(54) APPARATUS TO USE A REFRIGERATOR IN MOBILE COMPUTING DEVICE

(75) Inventors: Rajiv K. Mongia, Portland, OR (US); Himanshu Pokhama, San Jose, CA (US); Eric DiStefano, Livermore, CA (US)

(73) Assignee: Intel Corporation, Santa Clara, CA (US)

( * ) Notice: Subject to any disclaimer, the term of this patent is extended or adjusted under 35 U.S.C. 154(b) by 331 days.

(21) Appl. No.: 10/956,308

(22) Filed: Sep. 30, 2004

(65) Prior Publication Data

US 2005/0217279 A1   Oct. 6, 2005

Related U.S. Application Data

(63) Continuation-in-part of application No. 10/816,009, filed on Mar. 31, 2004.

(51) Int. Cl.
*F25B 9/00* (2006.01)
*F25D 23/12* (2006.01)

(52) U.S. Cl. .......................................... 62/6; 62/259.2
(58) Field of Classification Search ..................... 62/6, 62/259.2
See application file for complete search history.

(56) References Cited

U.S. PATENT DOCUMENTS

| 5,303,555 | A * | 4/1994 | Chrysler et al. ................ 62/6 |
| 6,378,313 | B2 * | 4/2002 | Barrash .......................... 62/6 |
| 6,711,905 | B2 * | 3/2004 | Howard .......................... 62/6 |
| 6,837,058 | B1 * | 1/2005 | McEuen et al. ............... 62/3.2 |
| 6,837,063 | B1 * | 1/2005 | Hood et al. ................. 62/259.2 |
| 6,970,355 | B2 * | 11/2005 | Ellsworth et al. ........... 361/694 |
| 2003/0101733 | A1 * | 6/2003 | Ogura et al. ..................... 62/6 |
| 2003/0192324 | A1 * | 10/2003 | Smith et al. ..................... 62/6 |
| 2004/0231341 | A1 * | 11/2004 | Smith .............................. 62/6 |

* cited by examiner

*Primary Examiner*—William C. Doerrler
(74) *Attorney, Agent, or Firm*—Cyndi M. Wheeler

(57) ABSTRACT

An apparatus to use a refrigerator in a mobile computing device is described. In one embodiment, the refrigerator is a thermoacoustic based refrigerator. In one embodiment, the refrigerator is a Stirling based refrigerator.

12 Claims, 5 Drawing Sheets

APPARATUS TO USE A REFRIGERATOR IN MOBILE COMPUTING DEVICE

This application is a continuation-in-part of application Ser. No. 10/816,009 titled "An Apparatus To Use A Refrigerator In Mobile Computing Device" filed Mar. 31, 2004, which is incorporated herein by reference.

FIELD OF INVENTION

The field of invention relates generally to heat management and more particularly to heat management using a refrigerator in a mobile computing device.

BACKGROUND

Heat management can be critical in many applications. Excessive heat can cause damage to or degrade the performance of mechanical, chemical, electric, and other types of devices. Heat management becomes more critical as technology advances and newer devices continue to become smaller and more complex, and as a result run at higher power levels and/or power densities.

Modern electronic circuits, because of their high density and small size, often generate a substantial amount of heat. Complex integrated circuits (ICs), especially microprocessors, generate so much heat that they are often unable to operate without some sort of cooling system. Further, even if an IC is able to operate, excess heat can degrade an IC's performance and can adversely affect its reliability over time. Inadequate cooling can cause problems in central processing units (CPUs) used in personal computers (PCs), which can result in system crashes, lockups, surprise reboots, and other errors. The risk of such problems can become especially acute in the tight confines found inside mobile computers and other portable computing and electronic devices.

Prior methods for dealing with such cooling problems have included using heat sinks, fans, and combinations of heat sinks and fans attached to ICs and other circuitry in order to cool them. However, in many applications, including portable and handheld computers, computers with powerful processors, and other devices that are small or have limited space, these methods may provide inadequate cooling.

DETAILED DESCRIPTION

An apparatus to use a refrigerator in a mobile computing device is described. In one embodiment, the refrigerator is a thermoacoustic based refrigerator. In one embodiment, the refrigerator is a Stirling based refrigerator.

The refrigerator includes a cold reservoir to absorb heat generated by a heat generating unit of the mobile device. The cold reservoir is to absorb heat generated by a heat generating unit of the mobile device. In one embodiment, the apparatus includes a working fluid loop, with fluid of the loop in thermal contact with the heat generating device, and the cold reservoir of the refrigerator to absorb heat from the fluid.

In the following description, numerous specific details are set forth. However, it is understood that embodiments may be practiced without these specific details. In other instances, well-known circuits, structures and techniques have not been shown in detail in order not to obscure the understanding of this description.

Reference throughout this specification to "one embodiment" or "an embodiment" indicate that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. In addition, as described herein, a trusted platform, components, units, or subunits thereof, are interchangeably referenced as protected or secured.

Figure 1A:
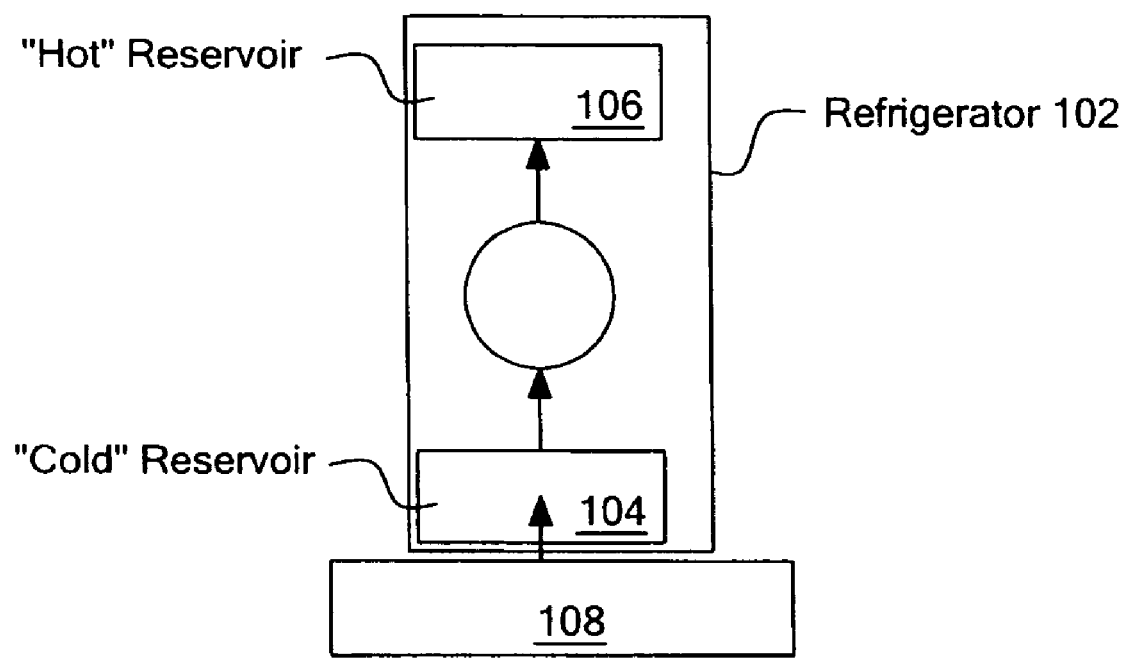
FIG. 1a presents an illustration of a refrigerator for thermal management of a heat generating unit within a computing device, in accordance with one embodiment.

FIG. 1a illustrates one embodiment of a refrigerator for thermal management of a heat generating unit within a mobile computing device. As illustrated, the refrigerator 102 includes a cold reservoir 104 and a hot reservoir 106. The cold reservoir absorbs heat generated by a heat generating component 108 within the computer system. The heat generating component may include a processor, a chipset, a graphics controller, a memory controller, and other alternative heat generating components.

In one embodiment, the cold reservoir 104 is in thermal contact with the heat generating component 108. In one embodiment, as illustrated in FIG. 1a, heat from the heat generating unit is transferred to the cold reservoir 104 of the refrigerator 102. The heat is then transferred to the hot reservoir 106, where the heat dissipates.

In one embodiment, the refrigerator is a thermoacoustic based refrigerator. In one embodiment, the thermoacoustic based refrigerator generates a standing wave by either an acoustic driver or piston. In alternative embodiments, alternative techniques may be used to generate the standing waive.

Figure 1B:
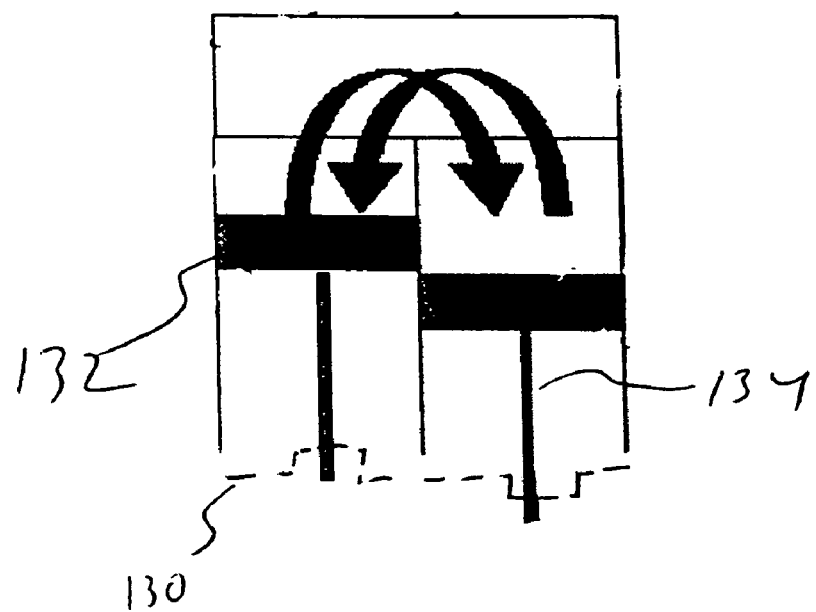
FIG. 1b presents an schematic of a Stirling refrigerator, in accordance with one embodiment.

In another embodiment, the non-refrigerant based refrigerator is a Stirling based refrigerator. FIG. 1b presents a schematic of one embodiment of a Stirling refrigerator. In one embodiment, a fluid is alternatively compressed and expanded via a cranch mechanism 130 with a displacer 132 and/or piston 134, resulting in the cooling effect. The cyclical process will result in different temperatures at different point of the cycle, and therefore can be used as a refrigeration device. In alternative embodiments, alternative Stirling configurations may be used.

Figure 2:
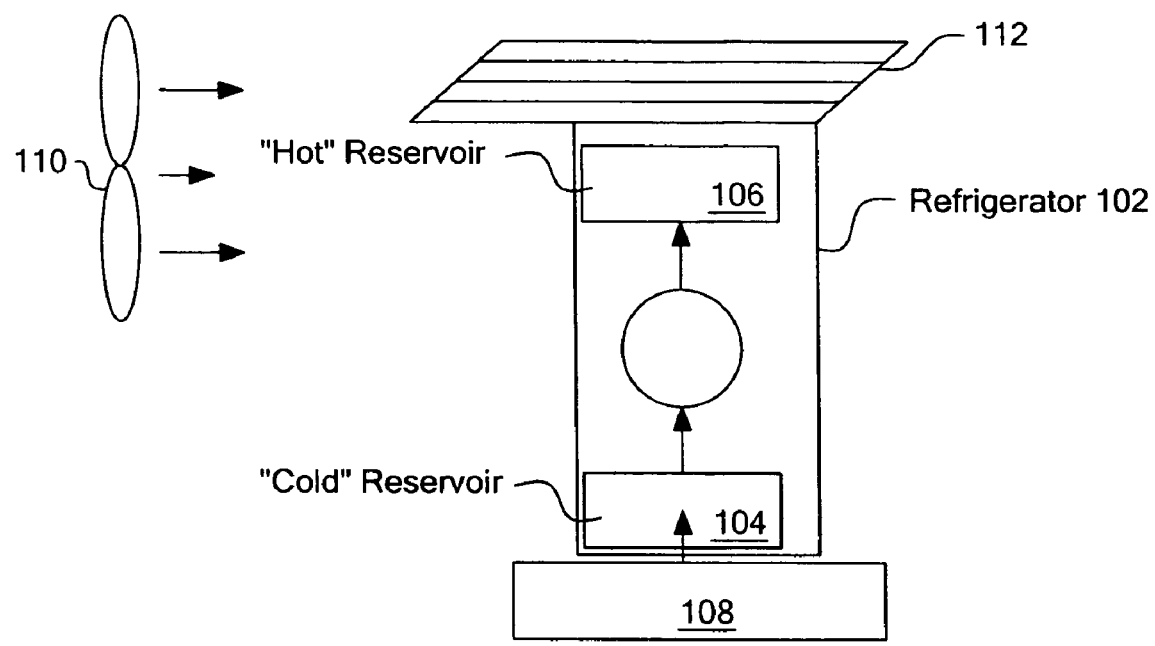
FIG. 2 presents an illustration of a refrigerator for thermal management of a heat generating unit within a computing device, in accordance with an alternative embodiment.

In one embodiment, illustrated in FIG. 2, a heat exchanger 112 is used to dissipate heat from the hot reservoir 106 of the refrigerator 102. In one embodiment, a heat exchanger fan 110 may be provided to supply air across the heat exchanger 112.

Figure 3:
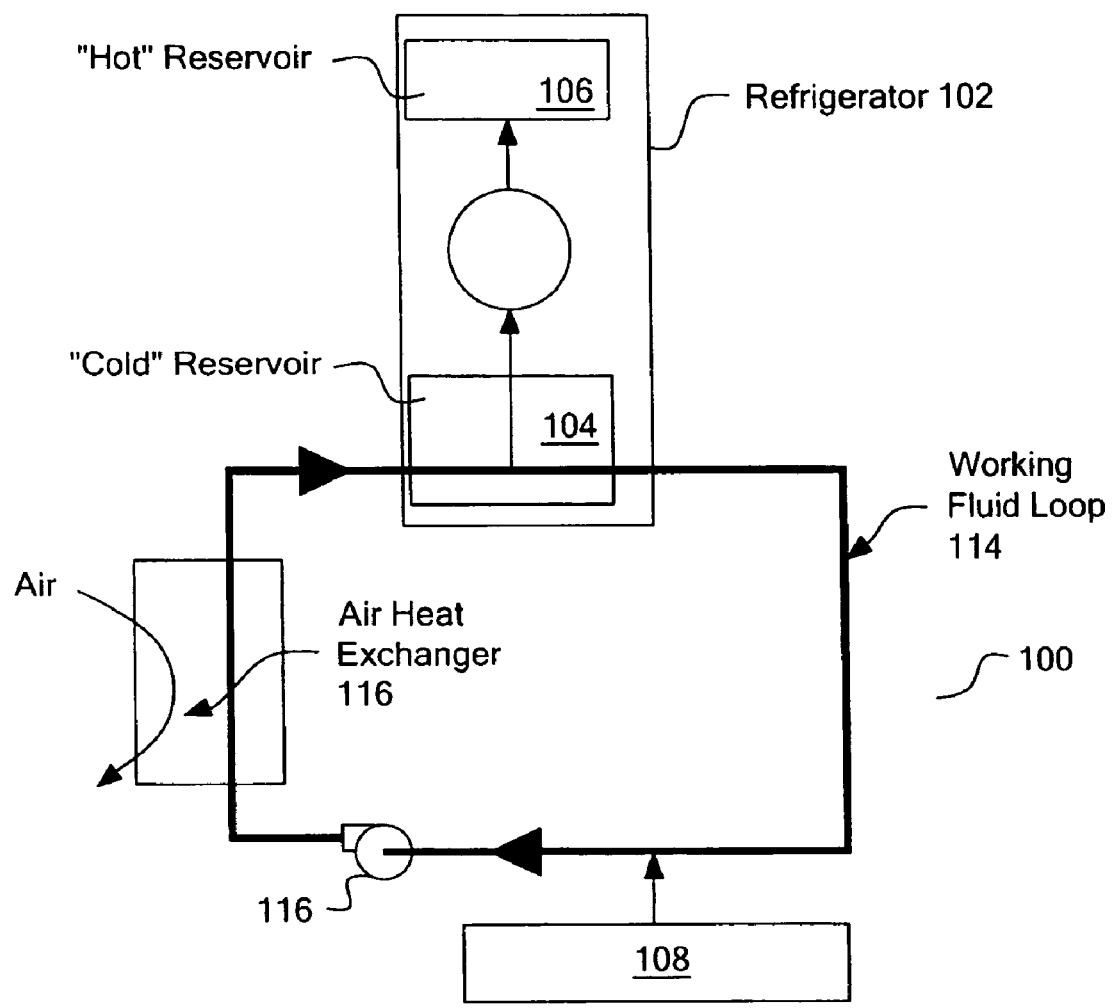
FIG. 3 presents an illustration of a refrigerator for thermal management of a heat generating unit within a computing device, in accordance with an alternative embodiment.

In one embodiment illustrated in FIG. 3, a working fluid loop 114 within the computing device 100 is used in conjunction with the refrigerator 102 to absorb heat of the component 108. As illustrated, the fluid of the loop 114 is pumped across the component 108, to absorb heat from the component. In one embodiment, working fluid loop 114 passes across or through a cold plate (not shown) thermally attached to the component 108 to absorb and transfer heat from the cold plate to loop 114.

Thereafter, the working fluid and/or vapor are passed through a heat exchanger 116 to dissipate heat. In one embodiment, the heat exchanger 116 is a fluid to air heat exchanger, wherein the fluid passes through a thermally conductive tube that may include fins attached to the tube to dissipate the heat from the working fluid and/or the vapor. A fan may be used to blow across the fins to dissipate the heat. In one embodiment, the heat exchanger is not present.

Thereafter, the working fluid of the loop 114 is passed across the cold reservoir 104 of the refrigerator 102, which absorbs additional heat from the working fluid. The working fluid of the loop 114 returns across the heat generating component 108, as described above. As illustrated in FIG. 3, the refrigerator 102 is located remotely from the heat generating component 108, in accordance with one embodiment. Alternatively, the refrigerator 102 may be located outside the mobile computing system in a docking station, or possibly as an external module.

Figure 4:
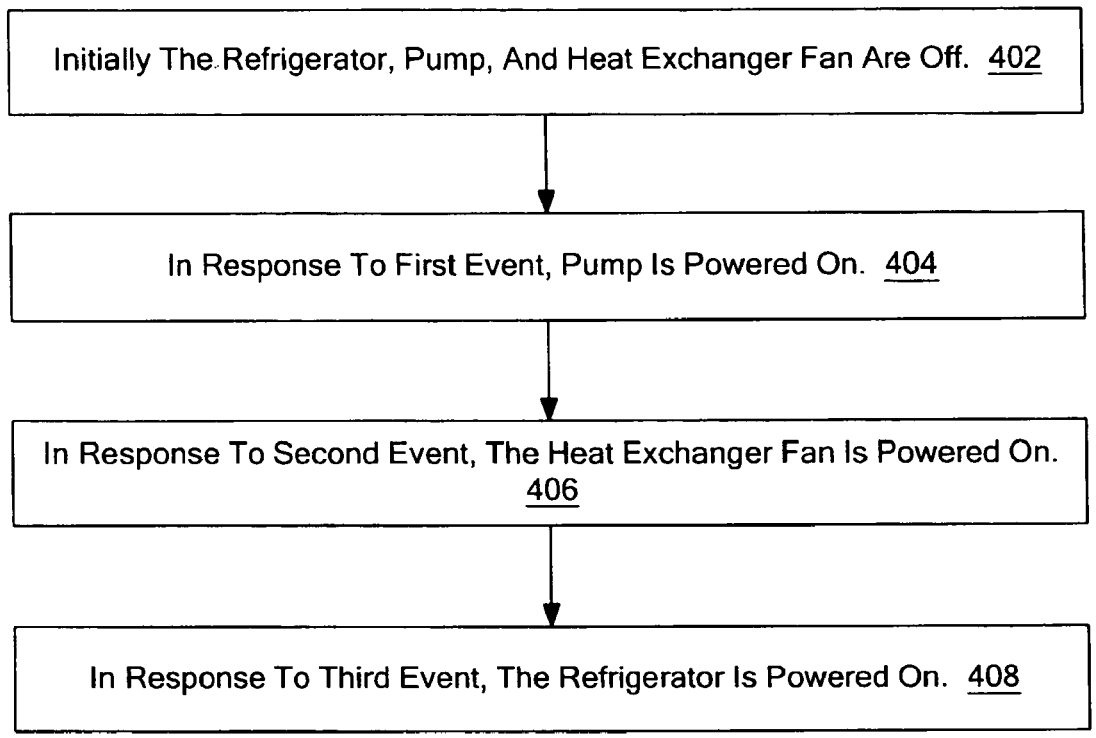
FIG. 4 presents a flow diagram describing a process of using a refrigerator for thermal management of a heat generating unit within a computing device, in accordance with one embodiment.

In one embodiment, the refrigerator 102 can be turned on or off based on a predetermined event, such as a temperature of the heat generating component 108, an internal ambient temperature of the computing device 100, a level of power provided to the component 108, whether the computing device 100 is receiving power from a battery source or power from an AC outlet, or other events. The flow diagram of FIG. 4, describes an example embodiment of the refrigerator 102 that is able to be turned on or off based on a temperature of the component 108.

In process 402, the refrigerator 102, a pump 118 of the fluid loop 114, and the heat exchanger fan 110 are off. In process 404, in response to the temperature of component 108 reaching a predetermined level a first time, the pump 118 is powered on, and the refrigerator and heat exchanger fan remain off. In process 406, in response to the temperature of component 108 reaching a predetermined level a second time, or reaching a separate predetermined level a first time, the heat exchanger fan is powered on, and the refrigerator remains off. In process 408, in response to the temperature of component 108 reaching a predetermined level a third time, or reaching a separate predetermined level a first time, the refrigerator is powered on. In alternative embodiments, the units, and the sequence of the units being powered on may vary. Also the predetermined events that trigger the units to be powered on, may vary.

In the foregoing specification, the invention has been described with reference to specific exemplary embodiments thereof. It will, however, be evident that various modifications and changes may be made thereto without departing from the broader spirit and scope of the invention as set forth in the appended claims. For example, the above described thermal management technique could also be applied to desktop computer device. The specification and drawings are, accordingly, to be regarded in an illustrative rather than a restrictive sense.

The invention claimed is:

1. An apparatus comprising:
   a refrigerator selected from a group of refrigerators comprising of a thermoacoutstic based refrigerator and a Stirling based refrigerator, the refrigerator to absorb heat generated by a heat generating unit for a mobile computing device, the refrigerator to include a cold reservoir and a hot reservoir, the cold reservoir to be in thermal contact with a working fluid loop, a fluid of the working fluid loop being in thermal contact with the heat generating unit, wherein a pump of the working fluid loop is powered off in response to the mobile computing device receiving power from a battery power source.

2. The apparatus of claim 1, wherein the refrigerator is located in one of a docking station for the mobile computing device and a module external to the mobile computing device.

3. The apparatus of claim 1, wherein the thermoacoustic based refrigerator is to generate a standing wave by one of an acoustic driver and piston.

4. The apparatus of claim 1, further including a heat exchanger to dissipate heat from the hot reservoir.

5. The apparatus of claim 1, to further include:
   a heat exchanger to dissipate heat from the fluid of the loop; and
   a fan to dissipate heat from the heat exchanger.

6. The apparatus of claim 5, wherein the cold reservoir is to absorb heat from the fluid of the loop after the heat exchanger has dissipated heat from the fluid of the loop.

7. The apparatus of claim 5, wherein the pump of the working fluid loop is powered on in response to the mobile computing device receiving power from an alternating current (AC) power outlet.

8. The apparatus of claim 5, wherein the fan is powered on in response to the heat generating unit reaching a given temperature.

9. The apparatus of claim 1, wherein the refrigerator is powered on in response to one or more events selected from a group of events consisting of: a source of power provided to the mobile computing device, a given detected temperature of the heat generating unit, a given detected internal ambient temperature of the mobile computing device and a level of power provided to the heat generating unit.

10. An apparatus comprising:
    a refrigerator to be placed in a mobile computing device, the refrigerator is selected from a group of refrigerators comprising of a thermoacoustic based refrigerator and a Stirling based refrigerator, the refrigerator including a cold reservoir and a hot reservoir, the cold reservoir to absorb heat generated by a heat generating unit of the mobile computing device;
    a working fluid loop with a fluid of the working fluid loop being in thermal contact with the heat generating unit, the cold reservoir of the refrigerator to absorb heat from the fluid of the working fluid loop;
    a heat exchanger to dissipate heat from the fluid of the loop;
    a fan to dissipate heat from the heat exchanger; and
    a pump to circulate the fluid of the working fluid loop between the heat generating unit and the cold reservoir, wherein the pump is powered off in response to the mobile computing device receiving power from a battery power source.

11. The apparatus of claim 10, further comprising a second heat exchanger to dissipate heat from the hot reservoir of the refrigerator.

12. The apparatus of claim 10, wherein the pump is powered on in response to the mobile computing device receiving power from an alternating current (AC) power outlet.

* * * * *